(12) United States Patent
Torii et al.

(10) Patent No.: US 7,306,965 B2
(45) Date of Patent: Dec. 11, 2007

(54) OXYGEN ION CONDUCTOR DEVICE, METHOD FOR FABRICATING OXYGEN ION CONDUCTOR DEVICE, AND OXYGEN CONCENTRATION CONTROL SYSTEM

(75) Inventors: Hideo Torii, Osaka (JP); Eiji Fujii, Osaka (JP); Taku Hirasawa, Kyoto (JP); Atsushi Tomozawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 337 days.

(21) Appl. No.: 11/064,999

(22) Filed: Feb. 25, 2005

(65) Prior Publication Data
US 2005/0184363 A1 Aug. 25, 2005

(30) Foreign Application Priority Data
Feb. 25, 2004 (JP) ............................. 2004-049381

(51) Int. Cl.
*H01L 21/00* (2006.01)

(52) U.S. Cl. ................. 438/49; 257/E29.167; 257/414; 438/766

(58) Field of Classification Search .................. 438/49, 438/766; 257/E21.52, E29.167, 414, 629; 204/431; 205/781
See application file for complete search history.

(56) References Cited

U.S. PATENT DOCUMENTS 6,165,336 A * 12/2000 Maki et al. .................. 204/415
6,787,014 B2 * 9/2004 Hasei et al. ................. 204/424

FOREIGN PATENT DOCUMENTS

| JP | 05-097552 A | * | 4/1993 |
| JP | 06-258280 A | * | 6/1994 |
| JP | 09-241003 A | * | 9/1997 |

* cited by examiner

*Primary Examiner*—Caridad Everhart
(74) *Attorney, Agent, or Firm*—McDermott Will & Emery LLP

(57) ABSTRACT

A first electrode thin film is formed on an upper surface of the oxygen ion conductive thin film so as to have a through hole. A resistor is formed on part of the upper surface of the oxygen conductive thin film located in the through hole. Thus, the oxygen ion conductive thin film can be directly heated by the resistor, so that oxygen ions can be speedily transferred with a low power. Therefore, the oxygen ion conductivity of the oxygen ion conductive thin film can be improved.

20 Claims, 10 Drawing Sheets

FIG. 6

| Sample No. | Oxygen ion conductor thin film | | | Time to reach oxygen concentration of 10% (sec) |
| --- | --- | --- | --- | --- |
| | Substitution element M | Composition ratio (mole ratio) M/(Zr + M) | Film thickness ($\mu$m) | |
| 1 | Y | 0.15 | 3.0 | 300 |
| 2 | Y | 0.15 | 5.6 | 310 |
| 3 | Y | 0.15 | 8.0 | 310 |
| 4 | Y | 0.15 | 1.0 | 290 |
| 5 | Y | 0.20 | 2.8 | 300 |
| 6 | Y | 0.30 | 3.1 | 300 |
| 7 | Y | 0.10 | 3.0 | 310 |
| 8 | Y | 0.06 | 2.9 | 310 |
| 9 | Yb | 0.15 | 2.9 | 300 |
| 10 | Yb | 0.15 | 7.9 | 310 |
| 11 | Yb | 0.15 | 1.0 | 300 |
| 12 | Yb | 0.25 | 3.1 | 300 |
| 13 | Yb | 0.06 | 3.0 | 310 |
| 14 | Sc | 0.15 | 3.0 | 280 |
| 15 | Sc | 0.15 | 5.6 | 290 |
| 16 | Sc | 0.06 | 1.0 | 300 |
| 17 | Sc | 0.20 | 8.0 | 290 |
| 18 | Ca | 0.15 | 3.0 | 290 |
| 19 | Ca | 0.15 | 1.0 | 290 |
| 20 | Ca | 0.15 | 8.0 | 310 |
| 21 | Ca | 0.10 | 3.0 | 300 |
| 22 | Ca | 0.10 | 5.5 | 300 |
| 23 | Ca | 0.10 | 7.9 | 310 |
| 24 | Ca | 0.05 | 3.0 | 310 |
| 25 | Mg | 0.15 | 2.9 | 300 |
| 26 | Mg | 0.15 | 5.4 | 300 |
| 27 | Mg | 0.15 | 8.0 | 310 |
| 28 | Mg | 0.20 | 3.0 | 300 |
| 29 | Mg | 0.20 | 1.0 | 290 |
| 30 | Mg | 0.05 | 3.0 | 320 |

FIG. 7

| Sample No. | Oxygen ion conductor thin film | | | Time to reach oxygen concentration of 10% (sec) |
|---|---|---|---|---|
| | Substitution element M | Composition ratio (mole ratio) M/(Zr + M) | Film thickness ($\mu$m) | |
| 31 | Y  | 0.15 | 3.0 | 300 |
| 32 | Y  | 0.15 | 5.5 | 310 |
| 33 | Y  | 0.20 | 3.1 | 300 |
| 34 | Y  | 0.10 | 3.0 | 310 |
| 35 | Yb | 0.15 | 3.0 | 300 |
| 36 | Sc | 0.15 | 3.0 | 280 |
| 37 | Ca | 0.15 | 3.0 | 290 |
| 38 | Ca | 0.10 | 5.5 | 300 |
| 39 | Mg | 0.15 | 2.9 | 300 |
| 40 | Mg | 0.20 | 3.0 | 300 |

FIG. 8

| Sample No. | Type of substrate | Ti content in first electrode thin film mol% | Oxygen ion conductor film | | | Crystal orientation due to X-ray diffraction | | Time to reach oxygen concentration of 10% (sec) |
|---|---|---|---|---|---|---|---|---|
| | | | Substitution element M | Composition ratio (mole ratio) M/(Zr + M) | Film thickness ($\mu m$) | Orientation plane | Orientation degree (%) | |
| 41 | Silicon | 2 | Y | 0.15 | 2.9 | (100) | 98 | 270 |
| 42 | | 0.2 | Y | 0.15 | 3.0 | (100) | 98 | 270 |
| 43 | | 5 | Y | 0.15 | 3.0 | (100) | 96 | 270 |
| 44 | | 8 | Y | 0.15 | 3.1 | (110) | 96 | 280 |
| 45 | | 5 | Y | 0.10 | 3.0 | (100) | 96 | 280 |
| 46 | | 8 | Y | 0.10 | 3.1 | (110) | 95 | 280 |
| 47 | | 8 | Y | 0.20 | 2.0 | (110) | 97 | 270 |
| 48 | | 5 | Y | 0.20 | 5.5 | (100) | 100 | 270 |
| 49 | | 0.2 | Ca | 0.15 | 2.1 | (100) | 98 | 270 |
| 50 | | 5 | Ca | 0.15 | 5.5 | (100) | 98 | 280 |
| 51 | | 0.2 | Mg | 0.15 | 3.1 | (100) | 98 | 270 |
| 52 | | 2 | Mg | 0.15 | 3.0 | (100) | 98 | 270 |
| 53 | | 5 | Mg | 0.20 | 2.0 | (100) | 95 | 270 |
| 54 | | 8 | Mg | 0.20 | 8.0 | (110) | 95 | 280 |
| 55 | | 5 | Yb | 0.15 | 2.9 | (100) | 97 | 270 |
| 56 | | 5 | Sc | 0.15 | 3.0 | (100) | 97 | 270 |
| 57 | Stainless-steel | 2 | Y | 0.15 | 3.0 | (100) | 98 | 270 |
| 58 | | 0.2 | Y | 0.15 | 3.0 | (100) | 98 | 270 |
| 59 | | 8 | Y | 0.15 | 3.1 | (110) | 96 | 280 |
| 60 | | 5 | Ca | 0.15 | 5.5 | (100) | 98 | 280 |
| 61 | Silicon | 0 | Y | 0.15 | 3.0 | Random orientation | | 300 |
| 62 | | 0 | Y | 0.10 | 3.0 | Random orientation | | 310 |
| 63 | | 0 | Y | 0.15 | 3.0 | (111) | 100 | 340 |

Rows 41–60: Examples. Rows 61–63: Comparison examples.

OXYGEN ION CONDUCTOR DEVICE, METHOD FOR FABRICATING OXYGEN ION CONDUCTOR DEVICE, AND OXYGEN CONCENTRATION CONTROL SYSTEM

CROSS REFERENCE TO RELATED APPLICATIONS

The disclosure of Japanese Patent Application No. 2005-6482 filed on Jan. 13, 2005 including specification, drawings and claims are incorporated herein by reference in its entity.

BACKGROUND OF THE INVENTION

1. Field of the Invention

The present invention relates to an oxygen ion conductor device including two electrode thin films and an oxygen ion conductive thin film interposed between the two electrode thin films, a method for fabricating the oxygen ion conductor device and an oxygen concentration control system using the oxygen ion conductor device.

2. Description of the Prior Art

Conventionally, oxygen concentration control systems for separating oxygen in a target air using an oxygen ion conductor device have been known. An oxygen ion conductor device used for such an oxygen concentration control system includes, for example, a solid electrolyte having oxygen ion conductivity and first and second electrode films disposed on both of surfaces of the solid electrolyte, respectively. When a DC voltage is applied to each of the electrode films to generate a potential difference between the electrode films, electrons are given to oxygen absorbed to a negative electrode film of the two electrode films. The oxygen is converted into oxygen ions. The oxygen ions move in the solid electrolyte to reach the other electrode film, i.e., a positive electrode film. Then, electrons are taken away by the positive electrode film and the oxygen ions are again converted into oxygen. In this manner, the oxygen concentration control system utilizes the oxygen ion conductivity of the oxygen ion conductor device to selectively separate oxygen from a target atmosphere, thereby reducing, for example, the oxygen concentration of inside of a refrigerator.

In the oxygen concentration control system, to improve a separation rate of oxygen in a target space, an oxygen ion conductor film is sometimes used as the solid electrolyte. Specifically, as shown in FIG. 10, the oxygen concentration control system includes a porous supporting substrate 103 at an opening of a wall surface 101 of a deoxygenated storage. On a surface of the supporting substrate 103 (i.e., a lower surface thereof in FIG. 10), an oxygen ion conductor device 102 including stacked layers, i.e., a first electrode thin film 104, an oxygen ion conductor device thin film 106 and a second electrode thin film 105 is provided. Moreover, the oxygen concentration control system further includes an ion-conduction driving power supply 107 for applying a voltage to the electrode films 104 and 105 and a heater 108 for heating the oxygen ion conductive thin film 106 to improve oxygen ion conductivity of the oxygen ion conductive thin film 106. The heater 108 is provided on an upper surface of the supporting substrate 103 with a spacer 110 interposed therebetween. Furthermore, a heater driving power source 109 is connected to the heater 108.

In the above-described structure, when the ion-conduction power source 107 and the heater power source 109 are energized, oxygen 111 in a target air in the deoxygenated storage is converted into oxygen ions in the second electrode thin film 105 and the oxygen ions move in the oxygen ion conductive thin film 106. In this case, the oxygen ion conductive thin film 106 is heated through the supporting substrate 103 and the spacer 110 by the heater 108, so that the oxygen ion conductivity of the oxygen ion conductive thin film 106 is increased. Therefore, oxygen ions moving in the oxygen ion conductive thin film 106 speedily reach the first electrode thin film 104 and are again converted into the oxygen 111. Thus, the oxygen 111 separated by the oxygen ion conductor device 102 passes through the porous supporting substrate 103 and then released to the outside of the deoxygenated storage (See Japanese Laid-Open Publication No. 9-241003).

The oxygen ion conductor device 102 is formed by forming the first electrode thin film 104, the oxygen ion conductive thin film 106 and the second electrode thin film 105 are formed in this order on a surface (a lower surface in FIG. 10) of the porous supporting substrate 103 of alumina by sputtering. Unless the supporting substrate 103 is porous, oxygen does not pass therethrough. Therefore, it is required that the supporting substrate 103 is porous.

SUMMARY OF THE INVENTION

As in the oxygen concentration control system described in Japanese Laid-Open Publication No. 9-241003, however, when a zirconia thin film is used as the oxygen ion conductive thin film 106, the oxygen ion conductive thin film 106 has to be heated to a high temperature by the heater 108 as has been described above. In the case of an inorganic oxygen ion conductor such as zirconia, oxygen ions hardly move in an ion conductive substance at a temperature of less than several hundred degrees centigrade.

In this case, as has been described, when the heater 108 is provided on the upper surface of the porous supporting substrate 103, the heater 108 has to heat the oxygen ion conductive thin film 106 with the supporting substrate 103, the spacer 110 and a space between the supporting substrate 103 and the spacer 110 interposed therebetween. Thus, heat required to increase the temperature of the supporting substrate 103, the spacer 110 and a gas in the space therebetween and also heat released in the supporting substrate 103, the spacer 110 and the space therebetween are wasted. Therefore, extra time and power are consumed in order to heat the oxygen ion conductive thin film 106.

In view of the above-described problems, the present invention has been devised and it is therefore an object of the present invention to provide an oxygen concentration control system which can effectively heat an oxygen ion conductive thin film and cause oxygen ions to speedily move at low power and an oxygen ion conductor device for use in the oxygen concentration control system.

A first oxygen ion conductor device according to the present invention includes: a first electrode thin film; an oxygen ion conductive thin film formed on an upper surface of the first electrode thin film; and a second electrode thin film formed on an upper surface of the oxygen ion conductive thin film. The oxygen ion conductor device further includes a supporting member provided on an upper surface of the second electrode thin film, and in the oxygen ion conductor device, the supporting member includes at least an opening through which part of the upper surface of the second electrode thin film is exposed. The upper surface of the second electrode thin film is a surface of the second electrode thin film that is an opposite side to a surface thereof which is in contact with the oxygen ion conductive thin film.

It is preferable that the opening has a diameter of 500 µm.

It is preferable that a through hole is formed in the first electrode thin film so that part of a lower surface of the oxygen ion conductive thin film is exposed through the though hole, and the oxygen ion conductor device further includes a resistor provided on a lower surface of the oxygen ion conductive thin film so as to be located in the through hole and be separated from the first electrode thin film. Herein, a resistor is an electrical resistor which generates Joule heat when being energized.

It is preferable that the resistor is formed of a Ni—Cr alloy or Pt.

It is preferable that the oxygen ion conductive thin film is formed of a material obtained by substituting part of Zr of $ZrO_2$ by at least a metal element selected from the group consisting of Y, Yb, Sc, Ca and Mg.

In one embodiment of the present invention, the oxygen ion conductive thin film is formed of a material which is obtained by substituting part of Zr of $ZrO_2$ by Y and of which a mole ratio of Y to (Zr+Y) is not less than 0.06 and not more than 0.30.

In one embodiment of the present invention, the oxygen ion conductive thin film is formed of a material which is obtained by substituting part of Zr of $ZrO_2$ by Yb and of which a mole ratio of Yb to (Zr+Yb) is not less than 0.06 and not more than 0.25.

In one embodiment of the present invention, the oxygen ion conductive thin film is formed of a material which is obtained by substituting part of Zr of $ZrO_2$ by Sc and of which a mole ratio of Sc to (Zr+Sc) is not less than 0.06 and not more than 0.20.

In one embodiment of the present invention, the oxygen ion conductive thin film is formed of a material which is obtained by substituting part of Zr of $ZrO_2$ by Ca and of which a mole ratio of Ca to (Zr+Ca) is not less than 0.05 and not more than 0.15.

In one embodiment of the present invention, the oxygen ion conductive thin film is formed of a material which is obtained by substituting part of Zr of $ZrO_2$ by Mg and of which a mole ratio of Mg to (Zr+Mg) is not less than 0.05 and not more than 0.20.

It is preferable that the first electrode thin film is formed of Pt or Pt containing not less than 0.2 mol % and not more than 8 mol % Ti.

It is preferable that the second electrode thin film is formed of Pt.

It is preferable that the oxygen ion conductive thin film has a film surface with the (100) or (110) plane preferred-crystal orientation.

It is preferable that the oxygen ion conductive thin film has a thickness of not less than 1 µm and not more than 8 µm.

It is preferable that at least part of the supporting member is formed of a material capable of shutting off a gas.

A second oxygen ion conductor device according to the present invention includes; a first electrode thin film; an oxygen ion conductive thin film formed on an upper surface of the first electrode thin film; and a second electrode thin film formed on an upper surface of the oxygen ion conductive thin film. The oxygen ion conductor device further includes a supporting member provided on at least an outer edge part of an upper surface of the second electrode thin film, and in the oxygen ion conductor device, exposed part of the upper surface of the second electrode thin film excluding the outer edge part accounts for 50% or more of the entire upper surface excluding the outer edge part. By saying that the exposed part of the upper surface of the second electrode thin film excluding the outer edge part accounts for 50% or more of the entire upper surface excluding the outer edge part, it is meant that 50% or more of the whole area of the upper surface of the second electrode thin film excluding the outer edge part is not covered by anything and exposed to the outer air. It is also meant that part of the upper surface of the second electrode thin film excluding the outer edge part which is covered with a covering material and is not exposed to the outer air accounts for less than 50% of the entire upper surface excluding the outer edge part.

A method for fabricating an oxygen ion conductor device according to the present invention includes the steps of: a) forming a first electrode thin film on an upper surface of a substrate; b) forming an oxygen ion conductive thin film on an upper surface of the first electrode thin film; c) forming a second electrode thin film on an upper surface of the second electrode thin film; d) forming, by plating, a supporting member of a metal at least on an outer edge part of the upper surface of the second electrode thin film; and e) removing the substrate.

Furthermore, it is preferable that the method further includes the steps of: f) patterning the first electrode thin film to form a through hole so that the through hole passes through the first electrode thin film and part of the upper surface of the oxygen ion conductive thin film is exposed through the through hole; and g) forming a resistor so as to be located in the through hole and be separated from the first electrode thin film.

It is preferable that the substrate is a silicon substrate or a stainless-steel plate.

It is preferable that the metal used in the step d) is a metal selected from the group consisting of Ni, Pt and Au.

An oxygen concentration control system includes: an oxygen ion conductor device including a first electrode thin film, an oxygen ion conductive thin film formed on an upper surface of the first electrode thin film and a second electrode thin film formed on an upper surface of the oxygen ion conductive thin film; a division wall to be attached to the oxygen ion conductor device for dividing a space into two; and an ion-conduction power source for applying a voltage to each of the first and second electrode thin films. In oxygen concentration control system, the oxygen ion conductor device further includes a supporting member provided on an upper surface of the second electrode thin film, and the supporting member includes at least an opening through which part of the upper surface of the second electrode thin film is exposed.

BRIEF DESCRIPTION OF THE DRAWINGS

FIG. 6 is a first table showing results of performance evaluation test for oxygen ion conductor devices.

FIG. 7 is a second table showing results of performance evaluation test for oxygen ion conductor devices.

FIG. 8 is a third table showing results of performance evaluation test for oxygen ion conductor devices.

DESCRIPTION OF THE PREFERRED EMBODIMENTS

When an inorganic oxygen ion conductor such as zirconia is used for an oxygen ion conductor device, it is important for increasing the conductivity of oxygen ions to reduce the thickness of the oxygen ion conductor device as much as possible so as to shorten a diffusion length of oxygen ions. When an oxygen ion conductive thin film is formed by sintering, it is very difficult to make the oxygen ion conductor thin plate to have a thickness of several hundred μm or less. Therefore, by heating an obtained oxygen ion conductor thin plate to a high temperature close to 800° C. and then operating the oxygen ion conductor device, the conductivity of oxygen ions is increased. On the other hand, in the oxygen concentration control system described in Japanese Laid-Open Publication No. 9-241003, an oxygen ion conductor is formed by sputtering, and therefore, the oxygen ion conductor can be made to have a small thickness, i.e., 2 μm. However, with a porous supporting member subjected to sputtering, the porous supporting member has to be heated as well to increase the temperature of the oxygen ion conductor, thus requiring a large quantity of energy.

Moreover, when zirconia is heated to 400° C. or more, oxygen ions start moving therein. However, in a zirconia thin plate formed by sintering, transfer of oxygen ions is inhibited at a boundary between powders. Therefore, under present circumstances, the oxygen ion conductor device is operated at a high temperature.

The present inventors have conducted various examinations based on the above-described points. As a result, the present inventors had the following findings and reached the present invention. Assume that a pressure difference between two spaces obtained by division by the oxygen ion conductor device is small and the area of exposed part of the oxygen ion conductor device is small. Even if the oxygen ion conductor having a small thickness, i.e., of about several μm, the oxygen ion conductor does not have to be supported at an entire surface thereof by a supporting member. Also, if a surface of the oxygen ion conductor is preferentially oriented to the (100) plane or the (110) plane, the mobility of oxygen ions is increased even at a little low temperature.

Hereinafter, embodiments of the present invention will be described with reference to the accompanying drawings.

Embodiment 1

<Configuration of Oxygen Concentration Control System>

Figure 1:
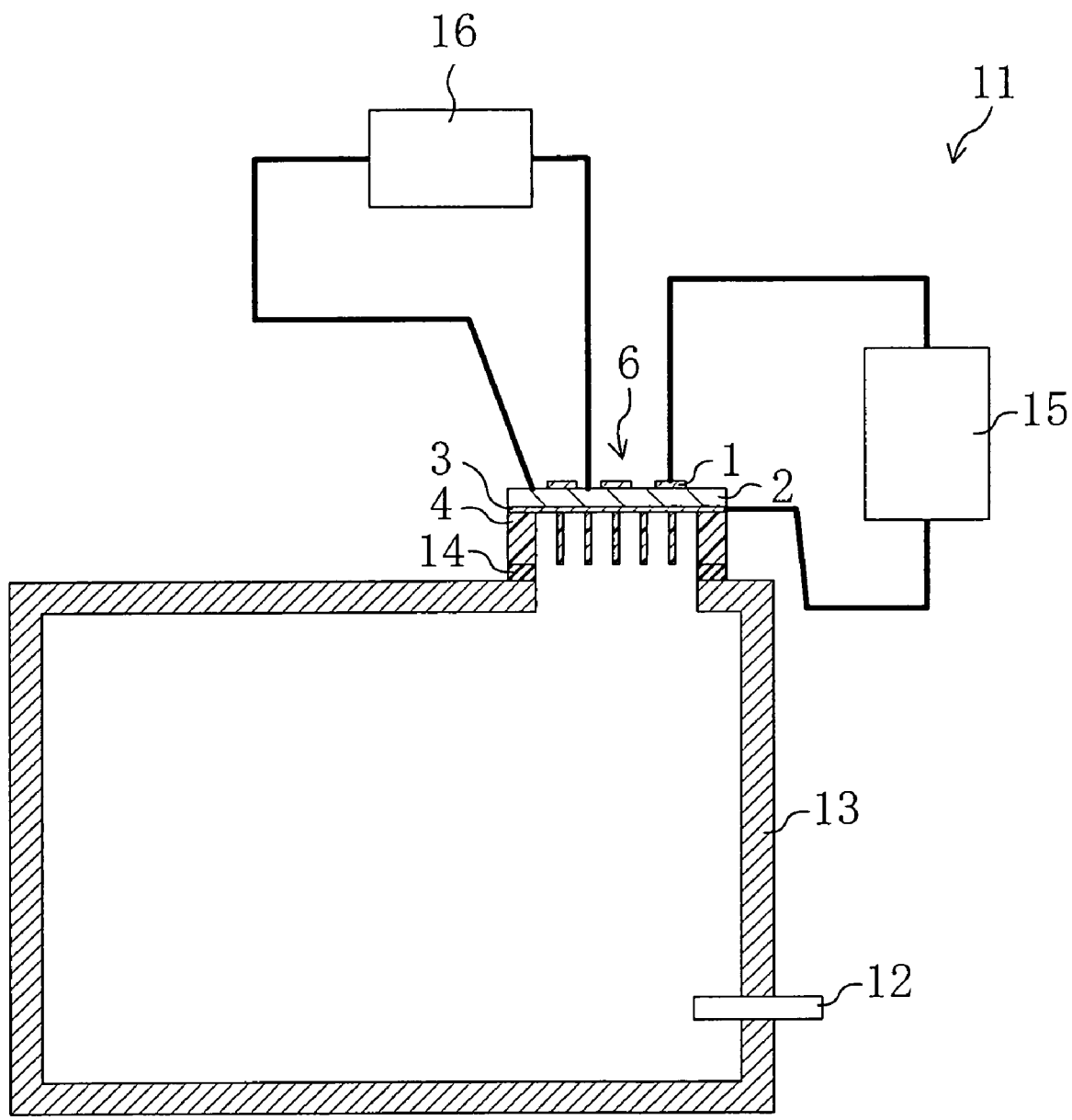
FIG. 1 is a schematic view of an oxygen concentration control system according to the present invention.

First, an oxygen concentration control system 11 according to Embodiment 1 will be described with reference to FIG. 1. FIG. 1 is a schematic view of the oxygen concentration control system 11.

The oxygen concentration control system 11 includes an oxygen ion conductor device 6 and a division wall (stainless-steel closed storage) 13 to which the oxygen ion conductor device 6 is attached.

The stainless-steel closed storage 13 is formed of a closed and cavity container. In an upper portion of the stainless-steel closed storage 13, an opening having a square cross section is formed and the oxygen ion conductor device 6 is attached to the stainless-steel closed storage 13 with a silicon packing 14 interposed therebetween so as to correspond to the opening. As has been described, with the oxygen ion conductor device 6 attached to the stainless-steel closed storage 13, a space in which the oxygen concentration control system 11 is provided is divided into an internal space of the stainless-steel closed storage 13 and an external space outside of the stainless-steel closed storage 13. Moreover, in a wall of the stainless-steel closed storage 13 (a right-hand-side wall in FIG. 1), an oxygen concentration sensor 12 capable of measuring the oxygen concentration in the inside space of the stainless-steel closed storage 13 is provided.

The oxygen ion conductor device 6 includes a first electrode thin film 1, an oxygen ion conductive thin film 2, a second electrode thin film 3 and a supporting member 4. The first electrode thin film 1, the oxygen ion conductive thin film 2, the second electrode thin film 3 and the supporting member 4 are formed by stacking so as to be arranged in this order downward from the top in FIG. 1. Moreover, resistors formed of a resistive thin film (not shown) are formed on the oxygen ion conductive thin film 2.

Moreover, an ion conduction driving power supply 15 for applying positive and negative voltages to the first electrode thin film 1 and the second electrode thin film 3 is provided. The ion conduction driving power supply 15 is formed so as to be capable of switching between positive and negative polarities of voltages to be applied to the first and second electrode thin films 1 and 3.

Furthermore, the heater power supply 16 is connected to a resistive thin film formed on the oxygen ion conductive thin film 2. The resistive thin film is formed so as to generate heat when being energized by the heater power supply 16, thereby heating the oxygen ion conductive thin film 2.

<Structure of Oxygen Ion Conductor Device>

Figure 2A:
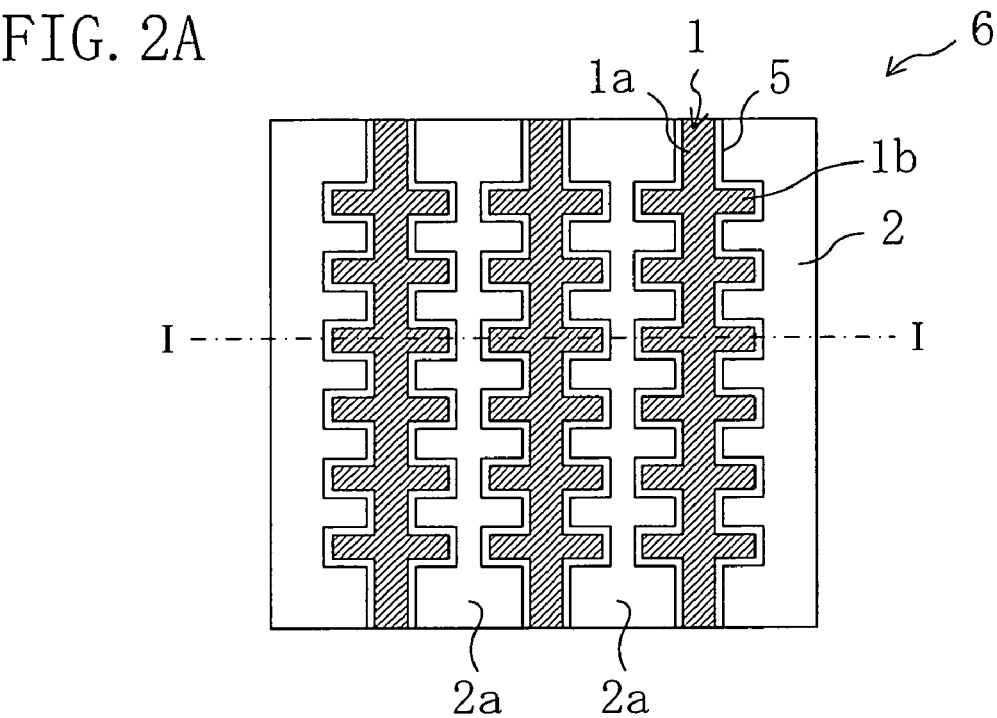
FIG. 2A is a plan view of an oxygen ion conductor device according to the present invention when viewed from the top.
Figure 2B:
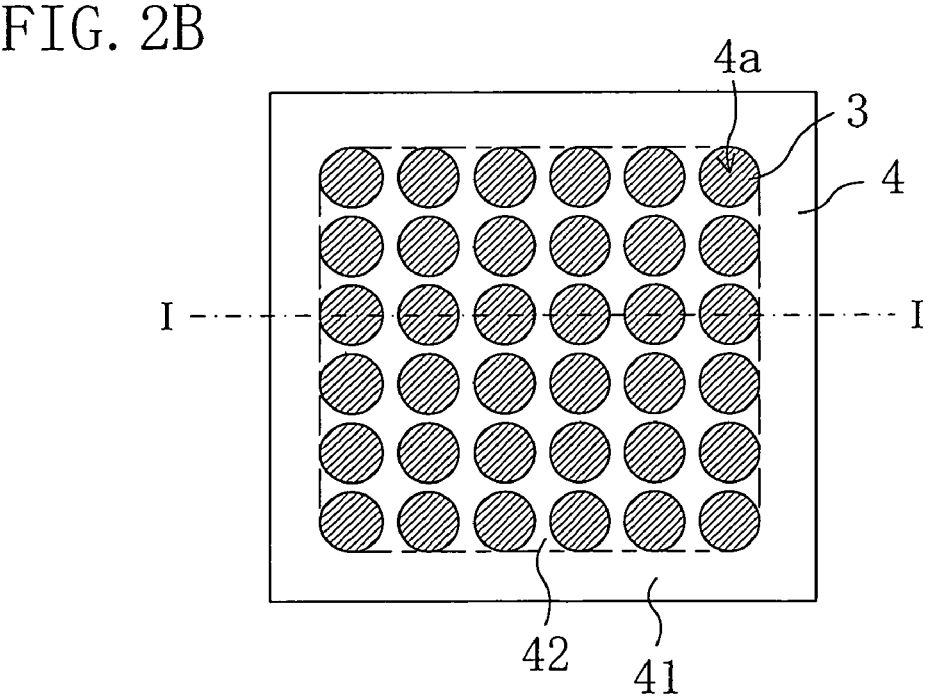
FIG. 2B is a plan view of the oxygen ion conductor device when viewed from the bottom.

Next, a specific structure of the oxygen ion conductor device 6 included in the oxygen concentration control system 11 of Embodiment 1 will be described in detail with reference to FIGS. 2A, 2B and 3. FIG. 2A is a plan view of the oxygen ion conductor device 6 of FIG. 1 when viewed from the top. FIG. 2B is a plan view of the oxygen ion conductor device 6 of FIG. 1 when viewed from the bottom. FIGS. 2A and 2B are not cross-sectional views of the oxygen ion conductor device 6, but some parts are hatched so that constituent members can be easily distinguished from one another. Furthermore, FIG. 3 is an enlarged view illustrating a cross section taken along the line I-I of FIGS. 2A and 2B.

The oxygen ion conductor device 6 of this embodiment has a platy square structure having outer dimensions of a length of 12 mm, a width of 12 mm and a height of 0.2 mm. As shown in FIG. 3, the oxygen ion conductor device 6 includes an oxygen ion conductive thin film 2 formed over the first electrode thin film 1, the second electrode thin film 3 formed over the oxygen ion conductive thin film 2, and a supporting member 4 for holding the second electrode thin film 3 from the upper surface side thereof. Moreover, on the lower surface of the oxygen ion conductive thin film 2, a resistive thin film 5 is formed so that the resistive thin film 5 is spaced away from each first electrode thin film 1.

The first electrode thin film 1 is formed on the lower surface of the oxygen ion conductive thin film 2 by patterning as shown in FIG. 2A. Specifically, the first electrode thin film 1 includes three electrode sections each having a comblike pattern. By this patterning, through holes 2a through which the lower surface of the oxygen ion conductive thin film 2 is exposed therethrough are formed. That is, each of through holes 2a is located in a region from which part of the first electrode thin film 1 has been removed so that the lower surface of the oxygen ion conductive thin film 2 is exposed therethrough. Each of the electrode sections formed into a comblike pattern includes a linear portion 1a formed so as to linearly extend from one end of the oxygen ion conductive thin film 2 to the other end thereof (from the top to the bottom in FIG. 2A) and a plurality of convex portions 1b such that six of convex portions 1b are provided in each of sides of the linear portion 1a in the width direction. The plurality of convex portions 1b in the first electrode thin film 1 are arranged so as to be separated from one another by a certain distance in the length direction. The number of the plurality of convex portions 1b is 12 for each of the electrode sections and 36 for total. In this embodiment, the first electrode thin film 1 is formed of a Pt film having a thickness of 0.1 μm.

Figure 3:
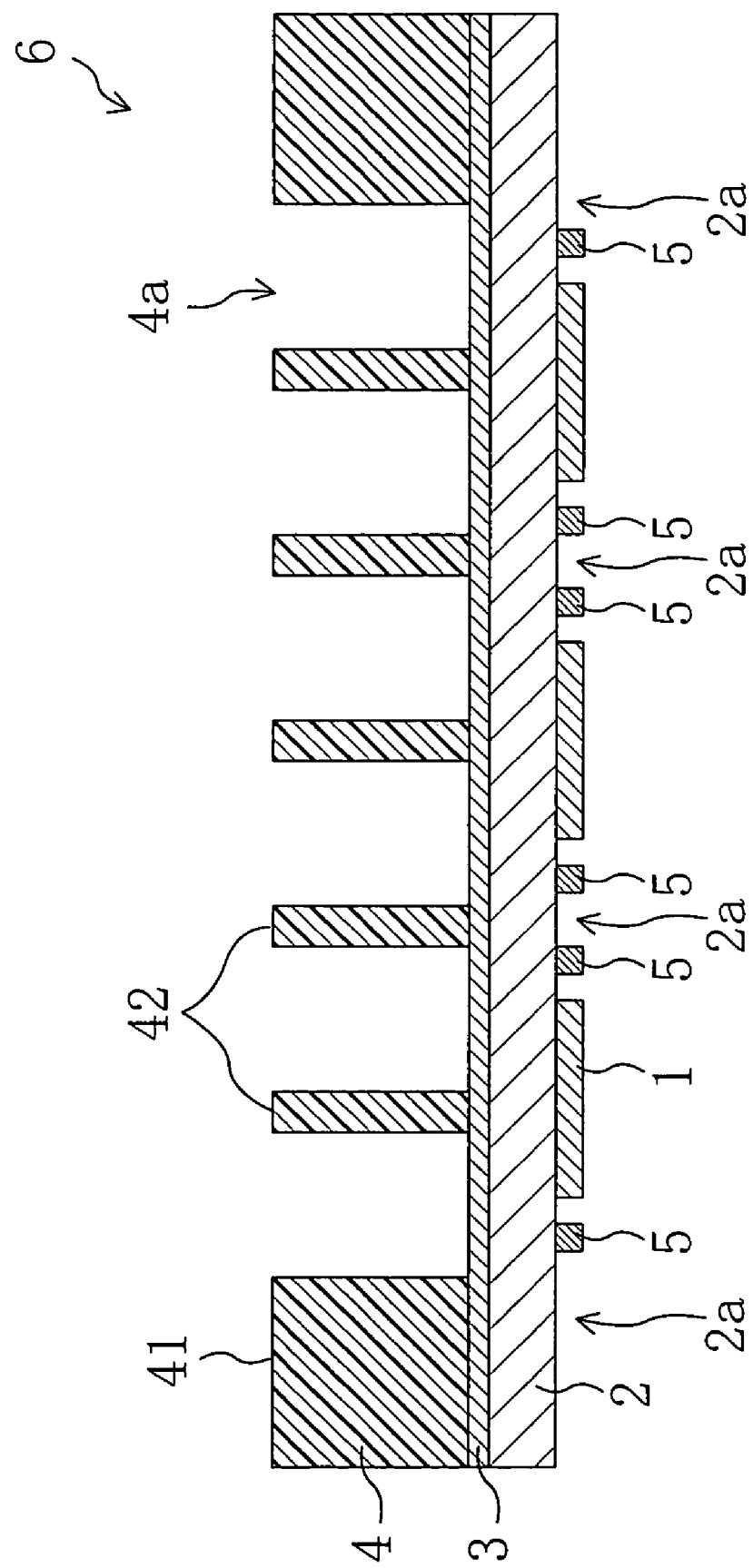
FIG. 3 is a cross-sectional view illustrating a cross section taken along the line I-I of an oxygen ion conductor device according to the present invention.

As show in FIG. 3, the resistive thin film 5 is formed on the lower surface of the oxygen ion conductive thin film 2 so as to be located in each of the through holes 2a formed by patterning the first electrode thin film 1. As shown in FIG. 2A, the resistive thin film 5 is formed as a zigzag or rectangular-wave line bending along the pattern of the first electrode thin film 1. In this embodiment, the resistive thin film 5 is formed of a Ni—Cr film having a line width of 30 μm and a thickness of 0.3 μm.

The oxygen ion conductive thin film 2 is formed of a $ZrO_2$ thin film to which yttrium (Y) is added, so as to have a thickness of 3.0 μm and a platy square shape.

As shown in FIG. 3, the second electrode thin film 3 is formed over the entire upper surface of the oxygen ion conductive thin film 2. The second electrode thin film 3 is formed of a Pt film having a thickness of 0.1 μm.

The supporting member 4 is formed on an upper surface of the second electrode thin film 3 so as to be capable of holding the first electrode thin film 1, an oxygen ions conductive thin film 2 and the second electrode thin film 3. Moreover, the supporting member 4 has a thickness of 0.2 mm and includes an outer edge supporting portion 41 located on an outer edge of the second electrode thin film 3 and a center part supporting portion 42 located over center part (a region excluding the outer edge) of the second electrode thin film 3. The outer edge supporting portion 41 and the center part supporting portion 42 are united as one. The outer edge supporting portion 41 has a belt shape with a width of 1 mm and extends along the periphery of the second electrode thin film 3. Herein, the outer edge of the upper surface of the second electrode thin film 3 means to be part of the second electrode thin film 3 mechanically supported by the outer edge supporting portion 41 of the supporting member 4 and extending along the periphery of the upper surface of the second electrode thin film 3 and inwardly by 0.2 mm or more from the outer edge. With a width of 0.2 mm or more, the outer edge supporting portion 41 can reliably hold the oxygen ion conductive thin film 2 and therefore is preferable. With a width of 0.5 mm or more, the oxygen ions conductor device 6 can be easily treated and therefore is more preferable. The upper limit for the width of the second electrode thin film 3 varies according to the thickness and area of the oxygen ion conductive thin film 2.

As shown in FIG. 2B, in the supporting member 4, a plurality of openings (circular holes) 4a are formed so as to be arranged in a honeycomb pattern or a uniform square lattice pattern and other part of the supporting member 4 than the openings forms the center part supporting portion 42. Specifically, in the supporting member 4, 36 of the circular holes 4a for total, each having a diameter of 1.35 mm, are formed so as to be arranged in six columns and six rows. Part of the upper surface of the second electrode thin film 3 is exposed through the circular holes 4a. The area of the part of the upper surface of the second electrode thin film 3 exposed through the circular holes 4a accounts for 52% of the whole area of the upper surface of the second electrode thin film 3 excluding the outer edge. The plurality of circular holes 4a formed in the supporting member 4 and the convex portions 1b of the first electrode thin film 1 are located so that the circular holes 4a face (correspond to) the convex portions 1b, respectively, with the oxygen ion conductive thin film 2 interposed therebetween. With this arrangement, more efficient ion conduction is allowed.

<Method for Fabricating Oxygen Ion Conductor Device>

Next, a method for fabricating the oxygen ion conductor device of Embodiment 1 will be described with reference to FIGS. 4A through 4J. FIGS. 4A through 4J are schematic views illustrating a method for fabricating the oxygen conductor device 6 of Embodiment 1 step by step. Moreover, FIGS. 4A through 4J are cross-sectional views taken along the line I-I of FIG. 2 schematically illustrating respective steps for fabricating the oxygen ion conductor device 6.

The oxygen ion conductor device 6 is fabricated mainly through Step A through Step G. Hereinafter, the respective process steps will be described in order.

In an initial stage of formation of an oxygen ion conductor device 6, a process step is performed on a silicon substrate 7 having a length and width dimension of 20 mm and a thickness of 0.31 mm. First, using a stainless-steel mask having a square opening with a length of 12 mm, a width of 12 mm and a thickness of 0.2 mm, a first electrode thin film 1 made of a Pt film and having thickness of 0.1 μm is formed over the silicon substrate 7 at a substrate temperature of 400° C. by RF magnetron sputtering (Step A of FIG. 4A).

Figure 4A:
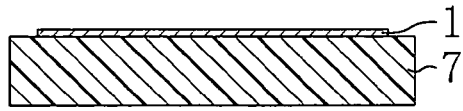
FIGS. 4A though 4J are cross-sectional views illustrating respective steps for fabricating an oxygen ion conductor device according to Embodiment 1 of the present invention.
Figure 4B:
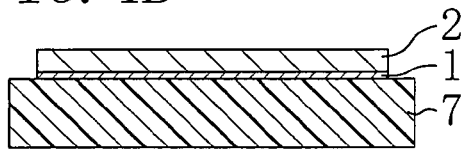

Next, using the same stainless-steel mask, an oxygen ion conductive thin film 2 made of a $ZrO_2$ thin film containing Y and having a thickness of 3.0 μm is formed over an upper surface of the first electrode thin film 1 by RF magnetron sputtering (Step B of FIG. 4B).

Step B will be described further in detail. First, yttrium oxide ($Y_2O_3$) powder and zirconium oxide ($ZrO_2$) powder are mixed so that the mole ratio between $Y_2O_3$ and $ZrO_2$ becomes 8:92. After the mixed powder has been sintered and pulverized into small particles twice, the mixture powder is pressed into a circular shape and then sintered at 1550° C. Thus, a sintered compact target of $ZrO_2$ containing Y ($Zr_{0.85}Y_{0.15}O_{1.93}$) of which the mole ratio to (Zr+Y) is 0.15 is formed. Next, a high frequency power of 600 W is applied to an RF magnetron sputtering apparatus with the sintered compact target installed to perform sputtering to the upper surface of the first electrode film 1 for about 120 minutes. When performing this film formation, the silicon substrate 7 on which the first electrode film 1 is formed is heated to 600° C. and held at the temperature. Moreover, using a mixed gas of argon and oxygen (with a gas volume ratio of $Ar/O_2=19/1$) as a sputtering gas, the total gas pressure of the mixed gas is held at 0.3 Pa. Thus, the oxygen ion conductive thin film 2 is formed over the upper surface of the first electrode thin film 1 so as to have a thickness of 3.0 μm.

Figure 4C:
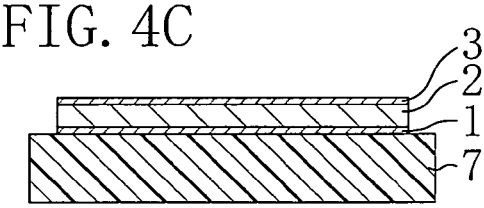

As the next step, using the same stainless-steel mask, a second electrode thin film 3 made of a Pt film and having a thickness of 0.1 μm is formed over the upper surface of the oxygen ion conductive thin film 2 by RF sputtering (Step C of FIG. 4C).

Next, a photosensitive resist is deposited as a coating over an upper surface of the second electrode thin film 3 to a thickness of 0.3 mm. Then, photolithography for exposure and development is performed using a photo mask having the same pattern as that of FIG. 2B including the circular holes 4a (36 holes for total arranged in 6 columns and 6 rows). Thus, an organic resin film 8 is deposited over the upper surface of the second electrode film 3 and then formed into a plurality of cylindrical projections (FIG. 4D).

Figure 4D:
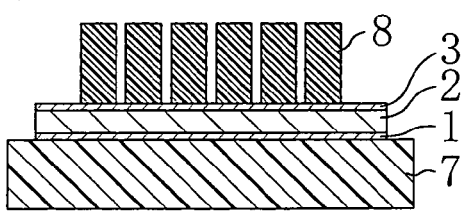
Figure 4E:
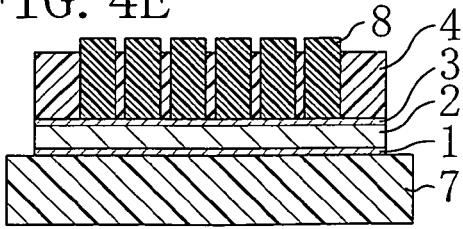

Furthermore, a fabrication body in the state of FIG. 4D is put into a Ni plating bath and then plating is performed using the second electrode thin film 3 as an electrode at a 40° C. for two hours. Then, a supporting member 4 made of a Ni film and having a thickness of 0.2 mm is formed around the cylindrical projections of the organic resin thin film 8 on the upper surface of the second electrode thin film 3 (FIG. 4E). The supporting member 4 may be formed of some other metal than Ni. In that case, the supporting member 4 is preferably formed of Pt or Au.

Figure 4F:
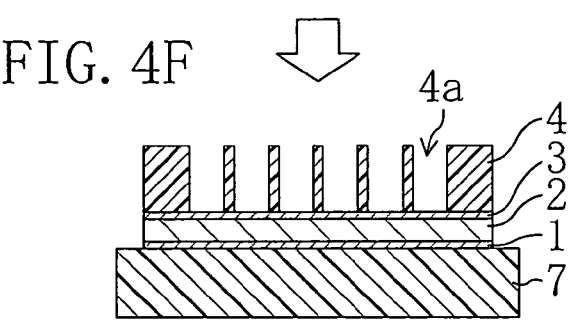

Next, the organic resin films 8 formed on the second electrode thin film 3 are removed using a KOH aqueous solution, thereby forming a supporting member 4 with a plurality of circular holes 4a (FIG. 4F).

Figure 4G:
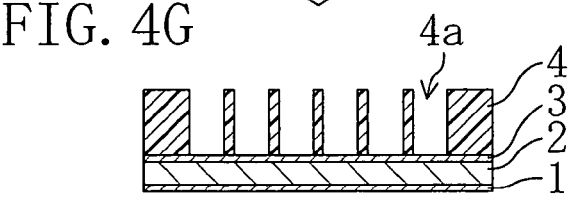
Figure 4H:
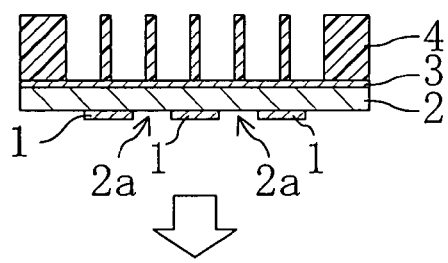

Next, dry-etching is performed with a plasma etching apparatus using $SF_6$ to remove the silicon substrate 7 (Step E of FIG. 4G).

Thereafter, the Pt film, i.e., the first electrode thin film 1 is dry-etched using photolithography to remove part of the Pt film so that the first electrode thin film 1 has a comblike pattern of FIG. 2A. Thus, through holes 2a through which the lower surface of the oxygen ion conductive thin film 2 is exposed are formed (Step F of FIG. 4H). In this step, a double-sided aligner is used to form the circular holes 4a of the supporting member 4 of FIG. 2B and the convex portions 1b of the first electrode thin film 1 of FIG. 2A so that the circular holes 4a face the convex portions 1b, respectively, with the oxygen ion conductive thin film 2 interposed therebetween.

Figure 4I:
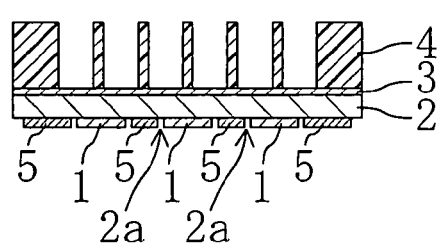

Next, using a stainless-steel mask, a resistive thin film 5 is deposited by RF sputtering so as to be located in each of the through holes 2a and separated from the first electrode thin film 1 (Step G of FIG. 4I).

Figure 4J:
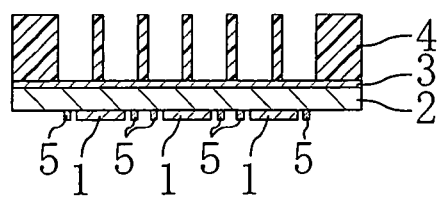

Finally, using photolithography, the resistive thin film 5 is processed so as to be formed in the pattern of FIG. 2A (FIG. 4J).

As has been described, the oxygen ion conductor device 6 of Embodiment 1 is fabricated through the process steps of FIGS. 4A through 4J (mainly Steps A through G).

Operation of Oxygen Concentration Control System

Next, an oxygen separation operation in the oxygen concentration control system 11 of this embodiment will be described with reference to FIG. 1. In this embodiment, the case where the ion-conduction power source 15 applies a positive voltage to the first electrode thin film 1 and a negative voltage to the second electrode thin film 3 will be described.

Oxygen in the internal space of the stainless-steel closed storage is in contact with the second electrode thin film 3 through the plurality of circular holes 4a formed in the supporting member 4. In this case, when the ion-conduction power source 15 and the heater power source 16 are energized, oxygen is absorbed to part of a surface of the second electrode thin film 3 exposed through the plurality of circular holes 4a. Electrons are given to oxygen absorbed in the second electrode thin film 3 and the oxygen is converted into oxygen ions. The oxygen ions pass through the second electrode thin film 3 and move in the oxygen ion conductive thin film 2. Then, the oxygen ion conductive thin film 2 is heated to about 800° C. by the resistive thin film 5 energized and caused to produce heat by the heater power source 16. Accordingly, the oxygen ion conductivity in the oxygen ion conductive thin film 2 is improved, so that oxygen ions speedily move in the ion conductive thin film 2. Then, the oxygen ions reach the first electrode thin film 1. When oxygen ions have reached the first electrode thin film 1, electrons are taken away from the oxygen ions by the first electrode thin film 1 and the oxygen ions are converted into oxygen. The oxygen passes through the first electrode thin film 1. In the above-described manner, oxygen selectively separated from the internal space of the stainless-steel closed storage 13 by the oxygen ion conductor device 6 is released to the outside of the stainless-steel closed storage 13.

<Evaluation Test of Performance of Oxygen Concentration Control System of Embodiment 1>

A performance evaluation test was performed to the oxygen concentration control system 11 of FIG. 1 to evaluate an oxygen separation performance of an oxygen concentration control system according to Embodiment 1. In this test, an atmosphere (with an oxygen concentration of 21%) was injected into and enclosed in the internal space of the stainless-steel closed storage 13. In this state, a voltage of 12 V was applied to the ion-conduction power source 15 and, at the same time, a voltage of 5 V was applied to the heater power source 16. At this time, the oxygen concentration of the internal space of the stainless-steel closed storage 13 was measured by an oxygen concentration sensor 12 to obtain an elapsed time from a time when a voltage was applied to a time when the oxygen concentration was reduced to 10%, thereby evaluating the oxygen separation performance of the oxygen concentration control system 11.

Results obtained from the evaluation test are shown in a table of FIG. 6. In the oxygen ion conductor device 6 (Sample 1) of Embodiment 1, within 300 seconds after application of voltages, the oxygen concentration of the internal space of the stainless-steel closed storage 13 was reduced to 10%. From the above-described results, it has been confirmed that in the oxygen ion conductor device 6 of Embodiment 1, an excellent oxygen separation property can be exhibited.

Moreover, in the oxygen concentration control system 11 using an oxygen ion conductor device 6 of Sample 1, voltages were applied to the ion-conduction power source 15 so that the polarities of the voltages become opposite to those described above (i.e., a negative voltage was applied to the first electrode thin film 1 and a positive voltage was applied to the second electrode thin film 3) and then the same test as the test described above was performed. As a result, the oxygen concentration of the internal space of the stainless-steel closed storage 13 was 21% at a start of application of voltages and, in contrast, the oxygen concentration was increased to 29% within 300 seconds after the start of the application of the voltages. From the results, it has been confirmed that with application of voltages of which polarities are inversed, the oxygen concentration of the internal space of the stainless-steel closed storage 13 can be increased.

Moreover, in an oxygen concentration control system 11 using the oxygen ion conductor device of Sample 1, the oxygen conductor device 6 was reversely disposed and attached to an opening portion of the stainless-steel closed storage 13, so that the first electrode thin film 1 faced to the internal space of the stainless-steel closed storage 13 while the second electrode thin film 3 faced the external space. The same test as the above-described test was performed. As a result, within 300 seconds after application of voltages, the oxygen concentration of the internal space of the stainless-steel closed storage 13 was reduced to 10%. From this result, it has been confirmed that in the oxygen ion conductor device 6, an excellent oxygen separation performance can be exhibited regardless of the direction in which oxygen moves.

Furthermore, the same test as the test described above was performed to an oxygen concentration control system 11 including an oxygen ion conductor device 6 in which a resistive thin film 5 was formed of a Pt film, instead of a Ni—Cr alloy. As a result, it has been confirmed that an oxygen ion conductive thin film 2 can be sufficiently heated and the same oxygen separation performance as that of the Sample 1 can be obtained.

<Evaluation of Influences of Composition and Thickness of Oxygen Ion Conductive Thin Film>

Next, to examine influences of the composition and thickness of an oxygen ion conductive thin film 2 in an oxygen ion conductor device 6 on an oxygen separation performance, Samples 2 through 30 of FIG. 6 for the oxygen ion conductor device 6 were formed. Specifically, Samples 2 through 8 of Table 1 are different in the composition ratio of Y to (Zr+Y) and the thickness of the oxygen ion conductive thin film 2 of Embodiment 1. Moreover, as for Samples 9 through 13 of Table 1, an oxygen ion conductive thin film 2 was formed using, instead of Y, ytterbium (Yb) as a substitution element in $ZrO_2$, and the composition ratio of Yb to (Zr+Yb) and the thickness of the oxygen ion conductive thin film 2 differ among Samples 9 through 13. In the same manner, oxygen ion conductive thin films 2 (Samples 14 through 17) in which Sc was used as a substitution element, oxygen ion conductive thin films 2 (Samples 18 through 24) in which Ca was used as a substitution element, oxygen ion conductive thin films 2 (Samples 25 through 30) in which Mg was used as a substitution element were formed with different composition ratios and thicknesses. Then, the same test as the test performed for Sample 1 was performed to all of Samples 2 through 30. As a result, it has been confirmed that an excellent oxygen separation performance can be obtained when an oxygen ion conductive thin film 2 is formed so as to contain any one of the substitution elements shown in FIG. 6 at any composition ratio of the composition ratios shown in FIG. 6 and have any thickness of the thicknesses shown in FIG. 6.

On the other hand, when the thickness of the oxygen ion conductive thin film 2 was smaller than 1 μm, a crack was generated in the oxygen ion conductive thin film 2 or like inconveniences occur in fabrication process steps, thus reducing workability. Therefore, it was difficult to fabricate the oxygen ion conductor device 6 with a high yield. Moreover, when the thickness of the oxygen ion conductive thin film 2 was larger than 8 μm, curling of the silicon substrate 7 (see FIG. 4B) on which the thin film was formed becomes larger, thus reducing processing accuracy in forming the second electrode thin film 3. Therefore, it was difficult to fabricate the oxygen ion conductor device 6 with a high yield.

Moreover, for $ZrO_2$ containing Y, when the composition ratio (Y/(Zr+Y)) was out of the range from 0.06 to 0.30, inconveniences such as the generation of a crack in a sintered compact occurred in forming a sintered compact target to be used in film formation by sputtering. Therefore, it was difficult to stably form a sintered compact target. In the same manner, when the composition ratio (Yb/(Zr+Yb)) for $ZrO_2$ containing Yb was out of the range from 0.06 to 0.25, when the composition ratio (Sc/(Zr+Sc)) for $ZrO_2$ containing Sc was out of the range from 0.06 to 0.20, when the composition ratio (Ca/(Zr+Ca)) for $ZrO_2$ containing Ca was out of the range from 0.05 to 0.15 and, furthermore, when a composition ratio (Mg/(Zr+Mg)) for $ZrO_2$ containing Mg was out of the range from 0.05 to 0.20, it was difficult to stably form a sintered compact target.

Effects of Embodiment 1

The followings are effects exhibited in the oxygen concentration control system and the oxygen ion conductor device of this embodiment.

In the oxygen ion conductor device 6 of this embodiment, the resistive thin film 5 is formed on the upper surface of the oxygen ion conductive thin film 2. Thus, when oxygen is separated, the resistive thin film 5 directly heats the oxygen ion conductive thin film 2 without anything interposed therebetween. Therefore, it is possible to effectively heat the oxygen ion conductive thin film 2. Furthermore, exposed part of the center part of the second electrode thin film 3 excluding the outer edge thereof accounts for 50% or more of the entire center part and only small part of the center part is in contact with the center part supporting member 42. This allows suppression of a flow of a large quantity of heat from the oxygen ion conductive thin film 2 to the supporting member 4. Thus, the temperature of the oxygen ion conductive thin film 2 can be speedily increased with a low power. Therefore, the oxygen ion conductivity of the oxygen ion conductive thin film 2 can be speedily improved and a faster responsivity at oxygen separation can be achieved. That is, the oxygen concentration of the inside of the closed storage 13 can be made to be a desired level in a short time. Moreover, an energy-saving property of the oxygen concentration control system including the oxygen ion conductor device can be improved.

Moreover, in the oxygen ion conductor device 6 of this embodiment, a plurality of openings are formed in the supporting member 4 to have a surface of the second electrode thin film 3 exposed. Thus, oxygen facing the second electrode thin film 3 can be speedily moved to the oxygen ion conductive thin film 2. Therefore, the oxygen separation rate of the oxygen ion conductor device, i.e., the oxygen separation property can be improved. More specifically, if a porous supporting member is included as in the technique described in Japanese Laid-Open Publication No. 9-241003, the level of oxygen permeability influences the mobility of oxygen. However, in this embodiment, since no porous substrate covering a surface of the second electrode thin film 3 is provided, reduction in the moving speed of oxygen due to the existence of the porous substrate is not caused.

Furthermore, the supporting member 4 is formed of Ni by plating, so that a gas is shut off and can not pass therethrough. Therefore, with the supporting member 4 in the periphery portion of the oxygen ion conductor device 6, a gas leak of the closed storage 13 can be prevented.

Moreover, in the oxygen concentration control device 11 of this embodiment, by switching around the polarities of the first and second electrode thin films 1 and 3 by the ion-conduction power source 15, oxygen can be made to move alternately in the two directions from one of the two spaces to the other and vice versa. Therefore, with the oxygen concentration control system 11, an oxygen concentration in one of the two spaces can be freely reduced or increased.

Embodiment 2

Next, an oxygen ion conductor device 6 according to Embodiment 2 will be described. The oxygen ion conductor device 6 of Embodiment 2 is formed by different fabrication method from the method of Embodiment 1, but other part than that has the same structure as that of Embodiment 1.

<Second Method for Fabricating Oxygen Ion Conductor Device>

A method for fabricating the oxygen ion conductor device 6 according to Embodiment 2 will be described with reference to FIG. 5. In the second method for forming the oxygen conductor device 6, instead of the silicon substrate 7, a stainless-steel substrate 9 is used as a substrate. FIGS. 5A through 5J are schematic views illustrating a method for fabricating the oxygen conductor device 6 of Embodiment 2 step by step. Moreover, FIGS. 5A through 5J are cross-sectional views taken along the line I-I of FIG. 2 schematically illustrating respective steps for fabricating the oxygen ion conductor device 6.

In the second method for forming the oxygen ion conductor device 6, an initial process step is performed on a stainless-steel plate 9 having a length and width dimension of 10 mm and a thickness of 0.31 mm. First, using a stainless-steel mask having a square opening with a length of 6 mm, a width of 6 mm and a thickness of 0.2 mm, a first electrode thin film 1 made of a Pt film and having thickness of 0.1 μm is formed over the stainless-steel plate 9 at a substrate temperature of 400° C. by RF sputtering (Step A of FIG. 5A).

Figure 5A:
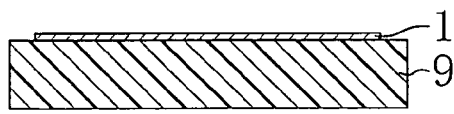
FIGS. 5A though 5J are cross-sectional views illustrating respective steps for fabricating an oxygen ion conductor device according to Embodiment 2 of the present invention.
Figure 5B:
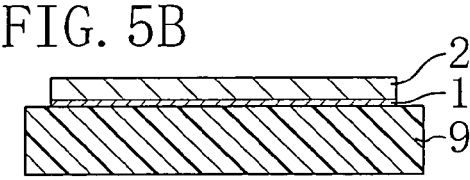

Next, using the same stainless-steel mask, an oxygen ion conductive thin film 2 made of a $ZrO_2$ thin film containing Y (the mole ratio of Y to (Zr+Y) is 0.15) and having a thickness of 3.0 μm is formed over an upper surface of the first electrode thin film 1 by RF sputtering (Step B of FIG. 5B).

Figure 5C:
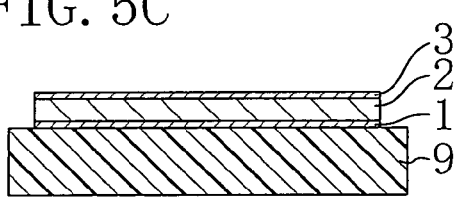

Furthermore, using the same stainless-steel mask, a second electrode thin film 3 made of a Pt film and having a thickness of 0.1 μm is formed over the upper surface of oxygen ion conductive thin film 2 by RF sputtering (Step C of FIG. 5C).

Next, a photosensitive resist as a coating is deposited over an upper surface of the second electrode thin film 3 to a thickness of 0.3 mm. Then, photolithography for exposure and development is performed using a photo mask having the same pattern (with 36 holes for total arranged in 6 columns and 6 rows) as that of the circular holes 4a of FIG. 2B. Thus, an organic resin film 8 is deposited over the upper surface of the second electrode film 3 and formed into a plurality of cylindrical projections (having a diameter of 0.7 mm) (FIG. 5D).

Figure 5D:
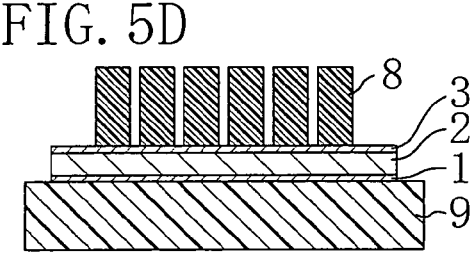
Figure 5E:
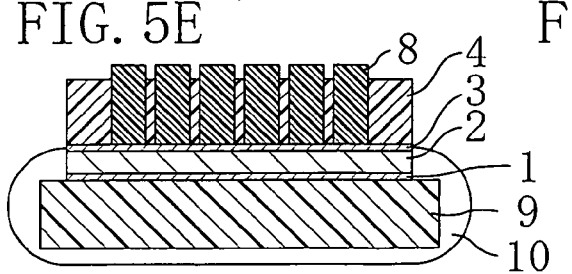

Furthermore, in a fabrication body in the state of FIG. 5D, the periphery of the stainless-steel plate 9 is coated with an organic resin wax 10 so as to be fully covered by the organic resin wax 10. Then, the coated stainless-steel plate 9 is confirmed to be electrically insulated. Thereafter, the fabrication body is put into a Ni plating bath and then plating is performed using the second electrode thin film 3 as an electrode at a 40° C. for two hours. Then, a supporting member 4 made of a Ni film and having a thickness of 0.2 mm is formed around each of the cylindrical projections of the organic resin thin film 8 on the upper surface of the second electrode thin film 3 (FIG. 5E). The supporting member 4 may be formed of some other metal than Ni. In that case, the supporting member 4 is preferably formed of Pt or Au.

Figure 5F:
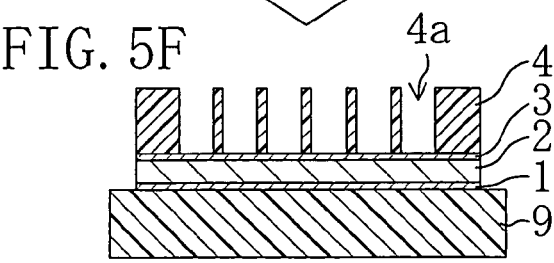

Subsequently, the organic resin film 8 formed on the second electrode thin film 3 is removed using a KOH aqueous solution, thereby forming a supporting member 4 in which a plurality of circular holes 4a are formed. Furthermore, the organic resin wax 10 is removed in a heated organic solvent (FIG. 5F).

Figure 5G:
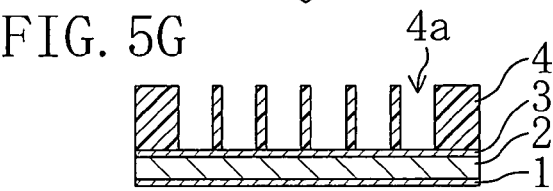
Figure 5H:
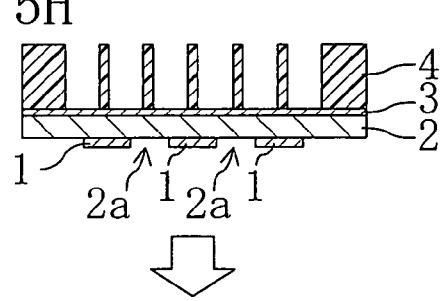

Next, the stainless-steel plate 9 is removed by performing wet etching while spraying a ferric chloride aqueous solution (Step E of FIG. 5G).

Thereafter, part of the Pt film, i.e., the first electrode thin film 1 is removed by dry etching using photolithography so that the first electrode thin film 1 has a comblike pattern of FIG. 2A. Thus, through holes 2a through which the lower surface of the oxygen ion conductive thin film 2 is exposed are formed (Step F of FIG. 5H). In this step, a double-sided aligner is used to form the circular holes 4a of the supporting member 4 of FIG. 2B and the convex portions 1b of the first electrode thin film 1 of FIG. 2A so that the circular holes 4a face the convex portions 1b, respectively, with the oxygen ion conductive thin film 2 interposed therebetween.

Figure 5I:
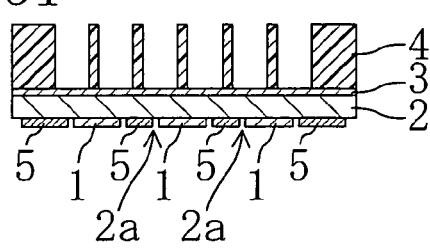

Next, a resistive thin film 5 is deposited using a stainless-steel mask by RF sputtering, so that resistive thin films 5 are provided so as to be separated from the first electrode thin film 1 (Step G of FIG. 5I).

Figure 5J:
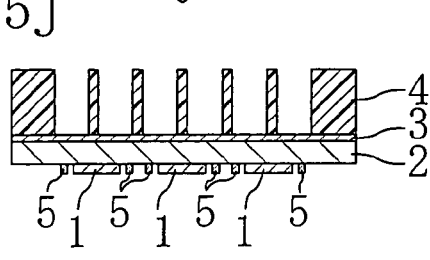

Finally, using photolithography, the resistive thin film 5 is processed so as to have the pattern of FIG. 2A (FIG. 5J).

As has been described, the oxygen ion conductor device 6 of Embodiment 2 is fabricated through the process steps of FIGS. 5A through 5J (mainly Steps A through G). In the oxygen ion conductor device 6, the circular holes 4a with a diameter of 0.7 mm are formed above the upper surface of the second electrode thin film 3 and thus exposed part of the surface of the center part of the second electrode thin film 3 accounts for 63% of the total area of the surface. The width of the outer edge supporting member is 0.7 mm.

<Evaluation Test of Performance of Oxygen Concentration Control System of Embodiment 2>

The same performance evaluation test as that of Embodiment 1 was performed to evaluate oxygen separation property of the oxygen ion conductor device 6 fabricated according to the above-described second fabrication method.

Results obtained from the evaluation test are shown in a table of FIG. 7. In an oxygen ion conductor device 6 according to Embodiment 2 (Sample 31), the oxygen concentration of the internal space of the stainless-steel closed storage 13 was reduced to 10% within 300 seconds after application of voltages. Therefore, it has been confirmed that in the oxygen ion conductor device 6 of Embodiment 2, an excellent oxygen separation performance can be exhibited.

Furthermore, to examine influences of the composition and thickness of the oxygen ion conductive thin film 2 on its oxygen separation performance, Samples 32 through 40 shown in FIG. 7 were formed as samples of the oxygen ion conductor device 6 fabricated according to the second fabrication method with different substitution elements, different composition ratios, different film thicknesses. The same performance evaluation test as the test performed to Sample 31 was performed to Samples 32 through 40. As a result, it has been confirmed that in an oxygen ion conductor device 6 fabricated according to the second fabrication method, an excellent oxygen separation performance can be exhibited, regardless of its composition and thickness.

Embodiment 3

Next, an oxygen ion conductor device 6 according to Embodiment 3 will be described. In the oxygen ion conductor device 6 of Embodiment 3, the first electrode thin film 1 is formed of Pt containing 2% Ti, whereas the first electrode thin film 1 of Embodiment 1 is formed of Pt. A method for fabricating the oxygen ion conductor device 6 is the same as that of any one of the above-described embodiments, except that Ti is added to Pt.

<Evaluation Test of Performance of Oxygen Concentration Control System of Embodiment 3>

The same performance evaluation test as that of Embodiment 1 was performed to evaluate oxygen separation property of an oxygen ion conductor device 6 of Embodiment 3. Results obtained from the evaluation test are shown in a table of FIG. 8. As a result, in an oxygen ion conductor device 6 (Sample 41) formed of Pt containing 2% Ti, the oxygen concentration of the internal space of the stainless-steel closed storage 13 was reduced to 10% within 270 seconds after application of voltages.

Moreover, to make comparisons among oxygen ion conductor devices 6 including first electrode thin films 1 with different Ti contents in Pt and different compositions and different thicknesses for the oxygen ion conductor film 2, Samples 42 through 56 of the oxygen ion conductor device 6 were formed. Furthermore, in the second fabrication method (in which the stainless-steel plate 9 is used as a substrate) of Embodiment 2, Samples 57 through 60 of the oxygen ion conductor device 6 were formed so that each of Samples 57 through 60 include a first electrode thin film 1 with a different Ti content in Pt.

The same evaluation test as the test described above was performed to evaluate respective oxygen separation performances of the samples of the oxygen ion conductor device 6. Obtained results show that in Samples 42 through 60, the oxygen concentration was reduced to 10% within 270 or 280 seconds after application of voltages.

From the results, it has been confirmed that when a first electrode thin film 1 is formed of Pt containing not less than 0.2% and not more than 8% Ti, the oxygen separation performance is improved, compared to the oxygen ion conductor device 6 of Sample 1.

<Evaluation of Influences of Crystal Orientation on Oxygen Separation Performance>

Next, for Samples 41 through 60 shown in FIG. 8, crystal orientation in a film surface of an oxygen ion conductor film 2 was examined to verify the relationship between crystal orientation and oxygen separation performance.

For further comparison, the following three samples (Samples 61 through 63) were formed and the same examination is performed thereto.

Using the same method as that of Embodiment 1 in which a silicon substrate 7 was used and a first electrode thin film 1 was formed of Pt containing no Ti, Samples 61 and 62 were formed. Sample 61 includes an oxygen ion conductor device 6 (a substitution element: Y) having the same composition ratio (0.15) and the same film thickness as those of Sample 7 of FIG. 6. Sample 62 was formed by reducing the Y content in Sample 61 to make the composition ratio to be 0.10. Samples 61 and 62 are different from Samples 41 though 46 in whether or not the first electrode thin film 1 contains Ti. Moreover, a first electrode thin film 1 was formed of Pt containing no Ti at a temperature of 550° C., thereby obtaining Sample 63 including an oxygen ion conductor device 6 (a substitution element: Y) having the same composition ratio and the same film thickness as those of Sample 7 of FIG. 6.

Specifically, in this examination, an X-ray diffraction analysis was performed to an oxygen ion conductive thin film 2 in a state of FIG. 4B or FIG. 5B in fabrication of an oxygen ion conductor device 6 to measure the X-ray intensity with respect to each crystal plane. Then, from obtained X-ray intensities, a crystal orientation (the degree of crystal orientation) was obtained for each of the (100) plane and the (110) plane. The degree of crystal orientation was defined as follows:

The degree of (100) crystal orientation (%)=(A/C)×100

The degree of (110) crystal orientation (%)=(B/C)×100 where A is the sum of X-ray intensities of (100) and (200), B is the sum of X-ray intensities of (110) and (220), and C is the sum of X-ray intensities of (100), (200), (110), (220), (111) and (222).

As a result of the examination, it was found that in any one of Samples 41 through 60, i.e., oxygen ion conductor devices 6 including a first electrode thin film 1 of Pt containing not less than 0.2% and not more than 8% Ti, the degree of crystal orientation with respect to the (100) plane or the (110) plane was 95% or more and a film surface of the oxygen ion conductive thin film 2 was preferentially oriented to the (100) plane or (110) plane. That is, the oxygen ion conductive thin film 2 is preferentially oriented to the (100) plane or the (110) plane in a parallel plane to its film surface.

On the other hand, each of Samples 61 and 62, i.e., oxygen ion conductor devices 6 including the first electrode thin film 1 of Pt containing no Ti exhibited not a remarkable crystal orientation but a similar X-ray diffraction pattern to that of sintered zirconia ceramic powder. It has been also confirmed that in Sample 63, i.e., an oxygen ion conductor device 6 including a first electrode thin film 1 of Pt containing no Ti which was formed at a different temperature, the oxygen ion conductive thin film 2 was preferentially oriented only to the (111) plane and the (222) plane in the parallel plane to its film surface. Note that the (111) plane and the (222) plane are equivalent to each other.

As in Samples 61 and 62, if the oxygen ion conductive thin film 2 has a random orientation, the oxygen separation performance of the oxygen ion conductive thin film 2 is poorer than that of a sample in which an oxygen ion conductive thin film 2 is oriented to the (100) plane or the (110) plane in the parallel plane to its film surface. Furthermore, the oxygen separation performance of a sample in which an oxygen ion conductor film 2 is preferentially oriented to the (111) plane in the parallel plane to its film surface is even poorer. A possible reason for this is that if an oxygen ion conductive thin film is oriented to the (111) plane in the parallel plane to its film surface, it is the most difficult to cause oxygen ions to move in the film thickness direction of the oxygen ion conductive thin film is the most difficult, and if the oxygen ion conductive thin film is preferentially oriented to the (100) plane or the (110) plane, it is the easiest to cause oxygen ions move therein. If an oxygen ion conductive thin film has a random orientation, the easiness of transfer of oxygen ions becomes just between the above-described two cases.

From the above-described results, it has been confirmed that if a film surface of an oxygen ion conductive thin film 2 is preferentially oriented to the (100) plane or the (110) plane, an oxygen separation performance is improved furthermore.

A preferentially oriented surface of the oxygen ion conductive thin film 2 is largely influenced by the composition of a first electrode film 1 for forming the oxygen ion conductive thin film 2. When the first electrode film 1 is formed of Pt containing not less than 0.2% and not more than 8% Ti, the oxygen ion conductive thin film 2 formed on the first electrode film 1 is preferentially oriented to the (100) plane or the (110) plane in the parallel plane to a surface of the oxygen ion conductive thin film 2. When the Ti content is smaller than 0.2%, the oxygen ion conductive thin film 2 tends to have a random orientation. When the Ti content is larger than 9%, the degree of orientation to the (100) plane or the (110) plane is reduced.

Other Embodiment

The above-described embodiments are examples of the present invention but the present invention is not limited to the examples. Holes in the center part of a supporting member is not limited to the circular holes but may be holes having a polygonal shape such as a triangle, a quadrangle and a pentagon. The holes may be elliptical holes or semicircular holes. The holes with a smaller diameter than 500 μm can be used under a normal condition. However, if the diameter of the holes is 500 μm or more, the temperature of an oxygen ion conductive thin film can be efficiently increased with a small quantity of heat, so that the oxygen transfer rate is preferably improved. If the diameter of the holes is 700 μm or more, the oxygen transfer rate can be improved with a smaller quantity of heat. Therefore, it is more preferable that the diameter of the holes is 700 μm or more.

If exposed part of a surface of a second electrode thin film located more inward than an outer edge supporting member of a supporting member accounts for 50% or more, the temperature of the oxygen ion conductive thin film can be efficiently increased with a small quantity of heat, so that the oxygen transfer rate is preferably improved.

Moreover, resistors may be provided on the same surface of the oxygen ion conductive thin film on which the second electrode thin film is provided. A member for heating the oxygen ion conductive thin film is not such a resistor provided on the oxygen ion conductive thin film. For example, the oxygen ion conductive thin film may be heated using an infrared heater or a laser.

Figure 9:
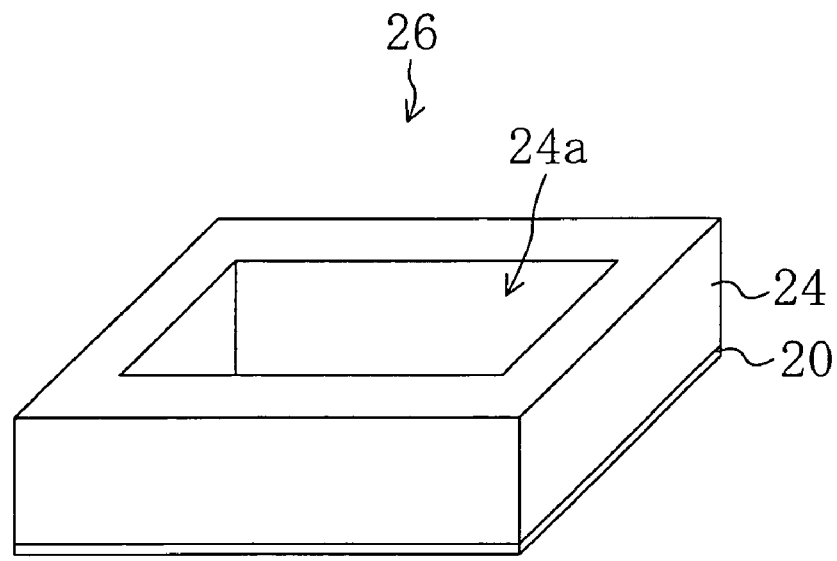
FIG. 9 is a schematic view illustrating an oxygen ion conductor device according to another embodiment of the present invention.
Figure 10:
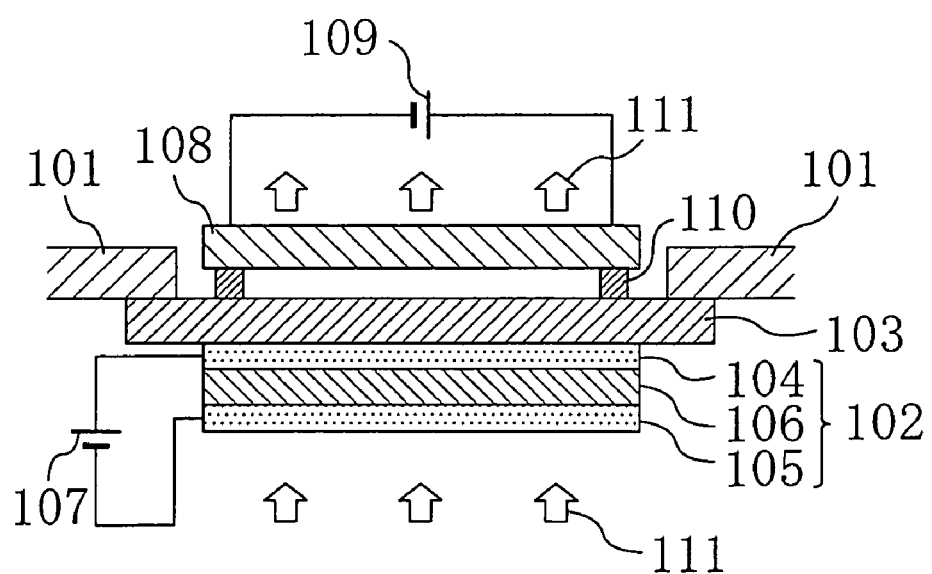
FIG. 10 is a schematic view illustrating a known oxygen concentration control system.

As shown in FIG. 9, a supporting member 24 may include only an outer edge supporting member without a center part supporting member. A three-layer portion 20 including two electrodes and an oxygen ion conductive thin film is supported at only an outer edge thereof and a large hole 24a is provided at center part of the supporting member 24. In an oxygen ion conductor device 26 having the above-described structure, a first electrode thin film is formed over the oxygen ion conductive thin film and no resistor is provided. Heating is performed by an infrared heater (not shown). In a so-called self-supporting film including no supporting member is provided in part thereof through which oxygen passes, heat from a heater does not escape to the supporting member and can be efficiently used for increasing the temperature of the oxygen ion conductive thin film, so that conduction of oxygen ions can be speedily performed with a small quantity of energy.

Figure 11:
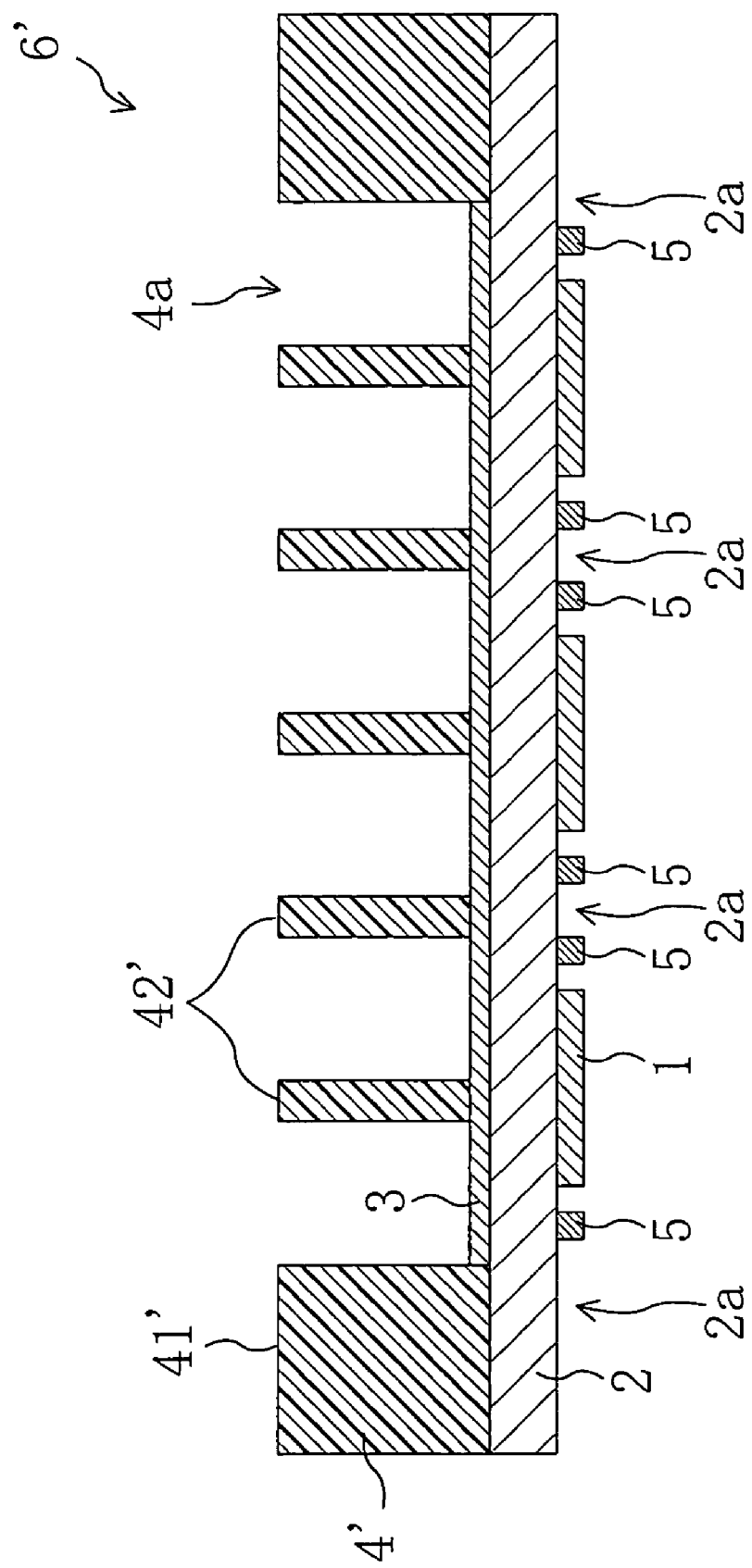
FIG. 11 is a schematic view illustrating an oxygen ion conductor device according to another embodiment of the present invention.

Furthermore, as shown in FIG. 11, an outer edge supporting member 41' of a supporting member 4' may be formed on a surface of an oxygen ion conductive thin film 2. In this case, when a second electrode thin film 3 is formed on the surface of the oxygen ion conductive thin film 2, a mask is placed over an outer edge portion of the oxygen ion conductive thin film 2. Thus, a second electrode thin film 3 is formed only over center part of an upper surface of the oxygen ion conductive thin film 2 (i.e., other part than the outer edge) but not in the outer edge portion. The outer edge supporting member 41' of the supporting member 4' is formed in the outer edge portion over which the second electrode thin film 3 is not formed. Note that other members such as a center part supporting member 42' are provided in the same manner as in Embodiment 1.

The supporting member may be formed of some other metal than Ni, Pt and Au. Moreover, the supporting member may be formed of a material such as plastic and ceramic as long as the material can shut off a gas.

According to the present invention, the following effects can be achieved.

According to the present invention, at least part of the surface of the second electrode thin film is exposed to a space. Thus, the first electrode thin film and the second electrode thin film can be provided so that each of the first and second thin films faces a space and only a thin film including three layers has to be heated. Therefore, an oxygen transfer rate when oxygen is separated can be increased. Also, the oxygen ion conductive thin film can be heated to a high temperature with a small quantity of heat. Therefore, the oxygen separation performance of the oxygen ion conductor device and energy efficiency can be improved.

Furthermore, according to the fabrication method of the present invention, reduction in a fabrication yield due to reduction in workability can be suppressed, so that the oxygen ion conductor device can be fabricated in a simple and efficient manner.

Moreover, with the oxygen concentration control system of the present invention, by switching between the respective polarities of the first and second electrode thin films, oxygen transfer can be performed alternately between the two directions from one of two spaces to the other and vice versa. Therefore, with the oxygen concentration control system, an oxygen concentration in one of the two spaces can be freely reduced or increased.

What is claimed is:

1. An oxygen ion conductor device comprising:
   a first electrode thin film;
   an oxygen ion conductive thin film formed on an upper surface of the first electrode thin film; and
   a second electrode thin film formed on an upper surface of the oxygen ion conductive thin film,
   wherein the oxygen ion conductor device further includes a supporting member provided on an upper surface of the second electrode thin film, and
   wherein the supporting member includes at least an opening through which part of the upper surface of the second electrode thin film is exposed, and
   wherein a through hole is formed in the first electrode thin film so that part of a lower surface of the oxygen ion conductive thin film is exposed through the though hole, and
   wherein the oxygen ion conductor device further includes a resistor provided on a lower surface of the oxygen ion conductive thin film so as to be located in the through hole and be separated from the first electrode thin film.

2. The oxygen ion conductor device of claim 1, wherein the opening has a diameter of 500 μm.

3. The oxygen ion conductor device of claim 1, wherein the resistor is formed of a Ni—Cr alloy or Pt.

4. The oxygen ion conductor device of claim 1, wherein the first electrode thin film is formed of Pt or Pt containing not less than 0.2 mol % and not more than 8mol % Ti.

5. The oxygen ion conductor device of claim 1, wherein the second electrode thin film is formed of Pt.

6. The oxygen ion conductor device of claim 1, wherein the oxygen ion conductive thin film has a film surface with the (100) or (110) plane preferred-crystal orientation.

7. The oxygen ion conductor device of claim 1, wherein the oxygen ion conductive thin film has a thickness of not less than 1 µm and not more than 8 µm.

8. The oxygen ion conductor device of claim 1, wherein at least part of the supporting member is formed of a material capable of shutting off a gas.

9. The oxygen ion conductor device of claim 1, wherein the oxygen ion conductive thin film is formed of a material obtained by substituting part of Zr of $ZrO_2$ by at least a metal element selected from the group consisting of Y, Yb, Sc, Ca and Mg.

10. The oxygen ion conductor device of claim 9, wherein the oxygen ion conductive thin film is formed of a material which is obtained by substituting part of Zr of $ZrO_2$ by Y and of which a mole ratio of Y to (Zr+Y) is not less than 0.06 and not more than 0.30.

11. The oxygen ion conductor device of claim 9, wherein the oxygen ion conductive thin film is formed of a material which is obtained by substituting part of Zr of $ZrO_2$ by Yb and of which a mole ratio of Yb to (Zr+Yb) is not less than 0.06 and not more than 0.25.

12. The oxygen ion conductor device of claim 9, wherein the oxygen ion conductive thin film is formed of a material which is obtained by substituting part of Zr of $ZrO_2$ by Sc and of which a mole ratio of Sc to (Zr+Sc) is not less than 0.06 and not more than 0.20.

13. The oxygen ion conductor device of claim 9, wherein the oxygen ion conductive thin film is formed of a material which is obtained by substituting part of Zr of $ZrO_2$ by Ca and of which a mole ratio of Ca to (Zr+Ca) is not less than 0.05 and not more than 0.15.

14. The oxygen ion conductor device of claim 9, wherein the oxygen ion conductive thin film is formed of a material which is obtained by substituting part of Zr of $ZrO_2$ by Mg and of which a mole ratio of Mg to (Zr+Mg) is not less than 0.05 and not more than 0.20.

15. An oxygen ion conductor device comprising;
a first electrode thin film;
an oxygen ion conductive thin film formed on an upper surface of the first electrode thin film; and
a second electrode thin film formed on an upper surface of the oxygen ion conductive thin film, wherein the oxygen ion conductor device further includes a supporting member provided on at least an outer edge part of an upper surface of the second electrode thin film, and
wherein exposed part of the upper surface of the second electrode thin film excluding the outer edge part accounts for 50% or more of the entire upper surface excluding the outer edge part.

16. A method for fabricating an oxygen ion conductor device, the method comprising the steps of:
a) forming a first electrode thin film on an upper surface of a substrate;
b) forming an oxygen ion conductive thin film on an upper surface of the first electrode thin film;
c) forming a second electrode thin film on an upper surface of the second electrode thin film;
d) forming, by plating, a supporting member of a metal at least on an outer edge part of the upper surface of the second electrode thin film; and
e) removing the substrate.

17. The method of claim 16, further comprising the steps of:
f) patterning the first electrode thin film to form a through hole so that the through hole passes through the first electrode thin film and part of the upper surface of the oxygen ion conductive thin film is exposed through the through hole; and
g) forming a resistor so as to be located in the through hole and be separated from the first electrode thin film.

18. The method of claim 16, wherein the substrate is a silicon substrate or a stainless-steel plate.

19. The method of claim 16, wherein the metal used in the step d) is a metal selected from the group consisting of Ni, Pt and Au.

20. An oxygen concentration control system comprising:
an oxygen ion conductor device including a first electrode thin film, an oxygen ion conductive thin film formed on an upper surface of the first electrode thin film and a second electrode thin film formed on an upper surface of the oxygen ion conductive thin film;
a division wall to be attached to the oxygen ion conductor device for dividing a space into two; and
an ion-conduction power source for applying a voltage to each of the first and second electrode thin films,
wherein the oxygen ion conductor device further includes a supporting member provided on an upper surface of the second electrode thin film, and
wherein the supporting member includes at least an opening through which part of the upper surface of the second electrode thin film is exposed, and
wherein a through hole is formed in the first electrode thin film so that part of a lower surface of the oxygen ion conductive thin film is exposed through the though hole, and
wherein the oxygen ion conductor device further includes a resistor provided on a lower surface of the oxygen ion conductive thin film so as to be located in the through hole and be separated from the first electrode thin film.

* * * * *